United States Patent
Mujahid et al.

(10) Patent No.: US 7,313,672 B2
(45) Date of Patent: Dec. 25, 2007

(54) INTELLECTUAL PROPERTY MODULE FOR SYSTEM-ON-CHIP

(75) Inventors: Fahad Ali Mujahid, Gwangju (KR); Dong-Soo Har, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 368 days.

(21) Appl. No.: 11/048,595

(22) Filed: Feb. 1, 2005

(65) Prior Publication Data

US 2006/0168314 A1 Jul. 27, 2006

(30) Foreign Application Priority Data

Jan. 5, 2005 (KR) .................. 10-2005-0000757

(51) Int. Cl.
*G06F 3/00* (2006.01)
(52) U.S. Cl. ..................................... 712/200
(58) Field of Classification Search ................. 712/200
See application file for complete search history.

(56) References Cited

U.S. PATENT DOCUMENTS 5,872,988 A * 2/1999 Duranton ..................... 712/22
6,052,754 A * 4/2000 Anand ........................ 710/305
6,145,073 A * 11/2000 Cismas ........................ 712/25
7,157,934 B2 * 1/2007 Teifel et al. .................. 326/38
2004/0236879 A1 * 11/2004 Croxford et al. ............. 710/48

FOREIGN PATENT DOCUMENTS

KR 2003-0030318 4/2003

OTHER PUBLICATIONS

Rower, T. etal, Intellectual Property Module of a Highly Parametrizable Embedded Stack Processor 1999, IEEE, pp. 399-403.*

* cited by examiner

*Primary Examiner*—Eric Coleman
(74) *Attorney, Agent, or Firm*—Ladas & Parry LLP

(57) ABSTRACT

Disclosed is an IP module for an SOC which brings easiness in designing system architecture and integration. The IP module of the invention includes a controller for generating a control signal for IP module with reference to a handshake signal and sending a control signal which leads the IP module to process input data in response to handshake signal; and a data processor generating output data and a modified handshake signal after processing a handshake signal and input data under the control of the controller. The present invention makes it possible to design an IP module that is easily reusable and optimized in architecture, lightening effort and time for designing and verifying an SOC by means of the proposed IP module.

2 Claims, 6 Drawing Sheets

INTELLECTUAL PROPERTY MODULE FOR SYSTEM-ON-CHIP

BACKGROUND

The present invention is concerned with an intellectual property (IP) module for a system-on-chip (SOC) which makes designing system architecture and integration easy.

It is now essential for fulfilling rapidly arising demands in multimedia facilities to cooperate with SOC technology that mounts millions of gates on a single chip. The SOC may be referred to as a semiconductor integrated circuit embedding main functions of the system in a single chip. The SOC generally includes hardware and software functional units, such as a memory, a processor, an external interface, an analogue and hybrid mode block, built-in software, an operating system (OS), and so forth.

While the current technology mounts 8 through 10 components on a single chip, it needs to be upgraded to be capable of containing 50 through 100 components therein in future. However, there are difficulties in designing an SOC by means of plural IP modules and integrating them on a single chip.

FIG. 1 is a block diagram illustrating a functional architecture of a general SOC.

As shown in FIG. 1, a general SOC is composed of plural IP modules, 10, 12, and 14, and a global central controller 20 which sends control signals to the IP modules, 10, 12, and 14, in order to operate the IP modules in whole and stores timings and sequential orders of the control signals. In such s structure of the SOC, the IP modules, 10, 12, and 14, receive the control signals that are in decoded forms from a global central controller 20, and then perform different operations depending on input data. The global central controller 20 generates all the control signals, stores data about different states of the IP modules, 10, 12, and 14, for a specific signal, and outputs control signals in sequence in response to requests from the IP modules, 10, 12, and 14, after decoding an interrupt signal and external signals received.

In the SOC, each of the IP modules, 10, 12, or 14, may be applicable to other SOCs that needs the function of the corresponding IP module, not limited to one SOC. However, in adapting such an IP module to another SOC, a global central controller of the another SOC needs to preliminarily know the number of pipelining steps by the IP module in order to generate a signal for controlling the IP module in a correct order.

Therefore, in the currently used SOC, the global central controller 20 controls all the IP modules 10, 12, and 14, and needs to preliminarily know the information about the IP modules, 10, 12, and 14, to generate control signals in correspondence with the information. As a result, a system operation time is lengthened and many difficulties are caused in mounting the IP module on another SOC. Furthermore, even after completing embedment of the IP module, it is difficult and complicate to verify a correct operation of the SOC and cumbersome to confirm correct generation of the control signals from the global central processor.

SUMMARY OF THE INVENTION

Accordingly, the present invention is directed to an IP module for an SOC, capable of easily transplanting an IP module and reducing a system operation time by distributed-controlling IP modules.

An aspect of the invention to achieve the object is an IP module for a system-on-chip, which is comprised of: a controller for generating a control signal for IP module with reference to a handshake signal and sending a control signal which leads the IP module to process input data in response to handshake signal; and a data processor generating output data and a modified handshake signal after processing a handshake signal and input data under the control of the controller.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain subject-matter of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

In designing an SOC with IP modules, the problems of skewing and jittering due to an increase of a clocking speed arise and power consumption for allocating clocks increases in the case of using a synchronous method with a global clock. Furthermore, it is necessary to consider delay time of transmission lines relatively longer than that of the devices, and a designing time increases due to differences of clock frequencies among IP modules. On the other hand, an asynchronous designing pattern is able to overcome the shortness of the synchronous pattern because it carries out data transmission by means of a handshake protocol, which is irrelevant to a delay time, without a global clock. In other words, the asynchronous SOC prosecutes data transmission by means of the handshake protocol, solving the problems of clock skewing, jittering, and power consumption and it improves the embedability and reusability of IP modules. Moreover, the asynchronous SOC provides stable data transmission among different IP modules by the handshake protocol and is advantageous to minimize various troubles arising in designing a large scale SOC.

The present invention is relevant to IP modules necessary for designing such an asynchronous SOC. Hereinafter, it will be described about a preferred embodiment of the present invention in conjunction with the accompanying drawings.

Figure 1:
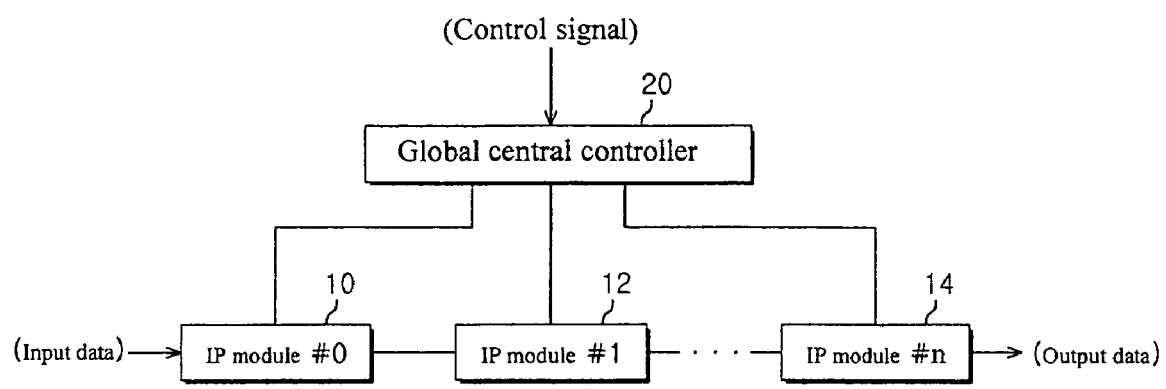
FIG. 1 is a block diagram illustrating an functional architecture of a general SOC.
Figure 2:
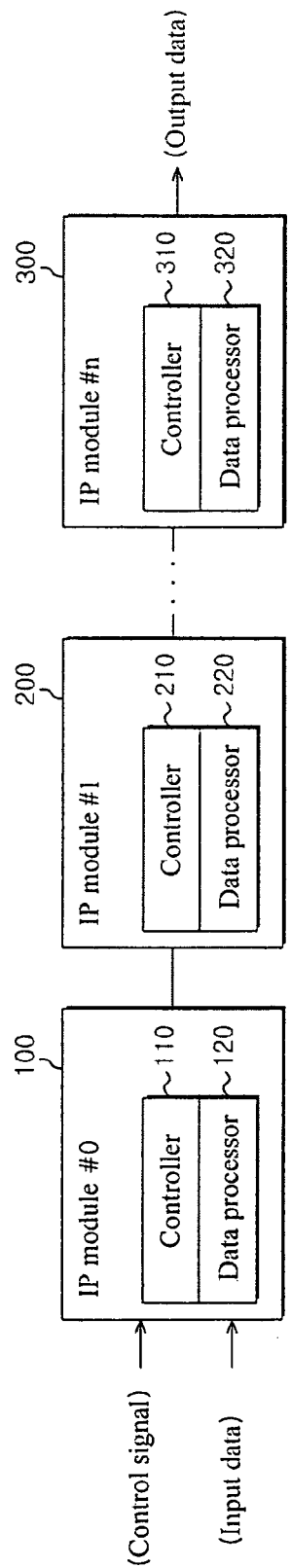
FIG. 2 is a block diagram illustrating an functional architecture of an SOC according to the present invention.

FIG. 2 is a block diagram illustrating a functional architecture of an SOC according to the present invention.

As shown in FIG. 2, the SOC is composed of plural IP modules 100, 200, and 300. The IP modules, 100, 200, and

300, each includes controllers, 110, 210, and 310, and data processors 120, 220, and 320, respectively.

In designing the IP modules 100, 200, and 300, handshake signals are established by determining standard signals necessary for handshake protocols proposed for a specific IP module group and then control signals are generated on basis of the handshake signals. The standard signals for the handshake protocols are various in accordance with IP modules, while including all the signals processed in the IP modules, such as Image_Start, Block_Strobe, Image_End, and Scan_Start in the case of IP modules for image processing.

FIGS. 3A through 3D are timing diagrams showing the types of handshaking signals necessary for IP modules mounted on the SOC.

Figure 3A:
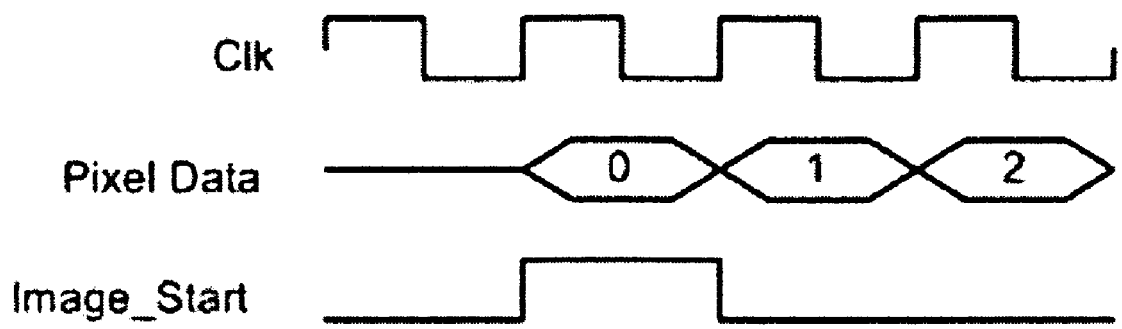
FIGS. 3A through 3D are timing diagrams showing the kinds of handshaking signals necessary for IP modules mounted on the SOC.
Figure 3B:
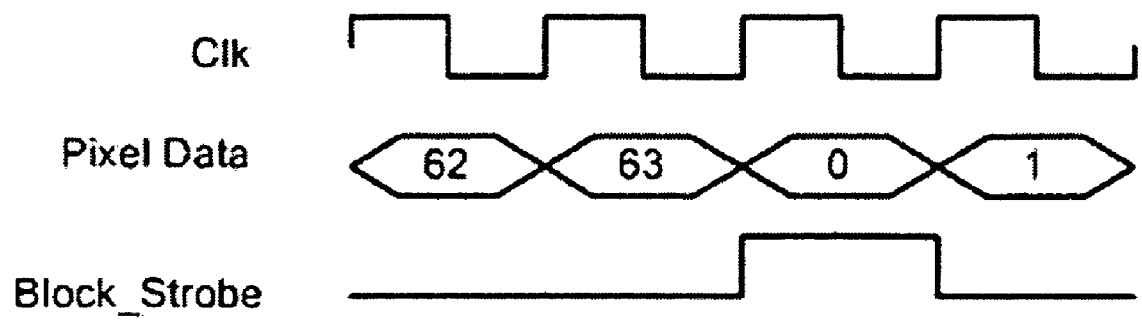
Figure 3C:
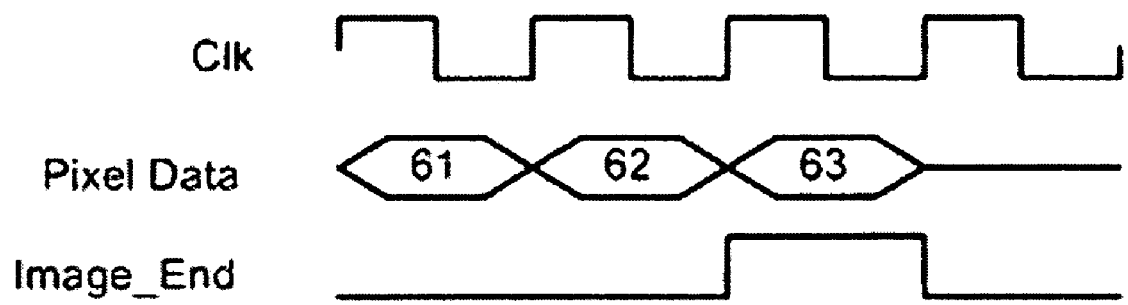
Figure 3D:
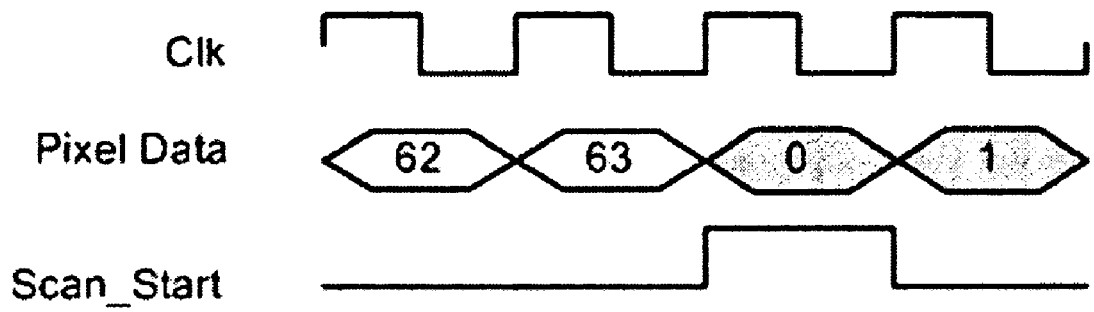

As illustrated in FIG. 3A, the Image_Start signal is used as the handshake signal to process input data of pixel data in the case of the IP module for image processing. As illustrated in FIG. 3B, the Block_Strobe signal is used as the handshake signal to process input data of pixel data in the case of the IP module for image processing. As illustrated in FIG. 3C, the Image_End signal is used as the handshake signal to process input data of pixel data in the case of the IP module for image processing. As illustrated in FIG. 3D, the Scan_Start signal is used as the handshake signal to process input data of pixel data in the case of the IP module for image processing.

The handshake signal established for each IP module is transferred through the same pipelining step with which the input data is processed, and the path changes whenever there is a request for processing the input data. When pipelining steps change due to variations of parameters in several IP modules, the handshake signals automatically vary according to the variations and therefore the sequential order of all control signals is maintained correct over all IP modules.

Each control signal generated with reference to the handshake signals is stored in the controllers 110, 210, and 310 respectively, and the handshake signals preliminarily established are forced to be inputted in accordance with data flow in a designated pipeline of a corresponding IP module so that the data processors, 120, 220, and 320, treat input data in compliance with the handshake signals.

The data processors, 120, 220, and 320, generate output data and modified handshake signals from input data when the preliminary established handshake signals are applied thereto by the controllers 110, 210, and 310. The output data and the modified handshake signal are applied to the IP module of the next stage. In other words, output data of the previous IP module is used as input data of the next IP module, and a modified handshake signal output from the previous IP module is used as a handshake signal for the next IP module.

On the other side, if a handshake signal is fixed to a specific one of the IP modules, i.e., if the same handshake signal is always applied to a specific IP module, the handshake signal is usable with being normally stored in the controller of its corresponding IP module.

As such, the present invention determines all handshake signals used in IP modules, and generates control signals from the handshake signals and stores the control signals in the controllers. If there is a request for data processing, the controller makes the handshake signal be inputted to the IP module in compliance with the control signal preliminarily stored in the controller and thereby manages the data processor of the IP module to generate the output data and the modified handshake signal after processing the input data. The output data and the modified handshake signal are used as input data and a handshake signal for the next IP module.

Although the present invention has been described in connection with the embodiments of the present invention illustrated in the accompanying drawings, it is not limited thereto. It will be apparent to those skilled in the art that various substitution, modifications and changes may be thereto without departing from the scope and spirit of the invention.

According to the present invention, it is able to design IP modules that are properly configured and easily reused by distributed-controlling the IP modules. Moreover, such IP modules are helpful for reducing effort and time for designing and verifying an SOC.

What is claimed is:

1. An IP module for a system-on-chip, comprising:
   a controller for generating a control signal with reference to a handshake signal for the IP module and output the control signal to process input data in response to the handshake signal; and
   a data processor generating output data and a modified handshake signal after processing the input data when the handshake signal and the input data are applied in compliance with the control signal of the controller,
   wherein the output data and the modified handshake signal are applied, as the input data and a handshake signal, to another IP module coupled to the IP module.

2. The IP module as set forth in claim 1, wherein when the handshake signal for the IP module is the same for all input data, the handshake signal is stored in the controller.

* * * * *